Feb. 20, 1934. F. O. MARSHALL 1,948,473
GENERATOR DRIVE ASSEMBLY
Filed Aug. 23, 1930

INVENTOR:
FRANK O. MARSHALL.
by Oscar Hochberg.
his ATTORNEY.

Patented Feb. 20, 1934

1,948,473

UNITED STATES PATENT OFFICE 1,948,473

GENERATOR DRIVE ASSEMBLY

Frank O. Marshall, Chicago, Ill., assignor to The Pullman Company, Chicago, Ill., a corporation of Illinois Application August 23, 1930. Serial No. 477,294

5 Claims. (Cl. 64—100)

The invention relates generally to an axle gear for driving car lighting or other power generators, and particularly to the means for securing the gear to the axle.

In generator drives employing gears, pulleys, or sprockets on the axle, the drive must overcome a considerable moment of inertia during the stopping, starting, and braking periods encountered in normal train movement. A sudden stoppage of wheels and axle like that encountered in coupling operations sets up rotational forces in the drive. If the drive is rigidly clamped to the axle and is of rigid construction, large forces will be built up at the point of contact between the gear and the axle. In special axle construction wherein the volume of metal at the drive position permits the drive to be keyed to the axle, the key and drive may be depended upon to prevent rotation of the drive upon such axle. In drives involving the standard rough turned tapered car axle now universally used, no such recourse to keying may be had since the present established contour and dimensions definitely limit the minimum sectional area of the axle at the drive position.

Efforts have been made heretofore to fix the drive to the axle through the medium of metal clamps and wedges designed to frictionally engage the surface of the axle. It was found that drives held by sheer pressure of metal parts upon the surface of the axle were soon loosened by the breaking down of the contacting surfaces resulting from a continuous reversal of stresses with each revolution of the axle.

This condition is created by deviations in the axle surface caused by flexing and torsional stresses in the axle body under load, whereby the axle body is subjected to constant change in lineal form, giving rise to a scrubbing action between the surface of the axle and the drive securing elements which operates progressively to lessen the grip of the drive with resultant sliding of the drive upon the axle. The high frequency vibrations set up in the axle by the rail hammer of the wheels also contribute to the eventual breaking down of the contacting surfaces between the axle and a rigid member tightly clamped thereon, tending to further loosen the drive.

To overcome the difficulties consequent upon the use of metal parts tightly clamped to the axle, it is herein proposed to effect the desired connection between the axle and drive by means of flexible bushings responsive to the weaving of the axle metal and having a high coefficient of friction. Rubber under compression has been found to possess these characteristics in a marked degree and has been selected to illustrate the present embodiment of the invention shown in the accompanying drawing, in which—

Figure 6:
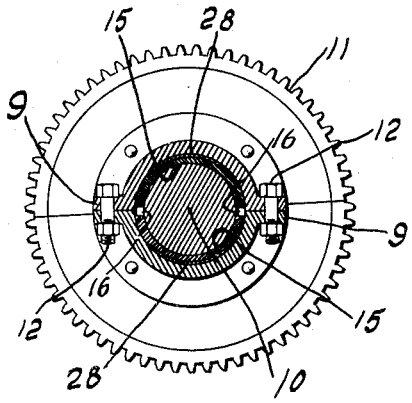
Figure 6 is a similar section transversely of the axle.

In said drawing, 10 represents the present standard rough turned tapered axle to which the drive 11 is applied. Since it is necessary to assemble the drive upon the axle without removing the wheels (not shown) the drive is divided and the parts held together by means of bolts 12 or other fastening devices whereby the drive may be disassembled for inspection or renewal. The hub 13 of the drive is formed with a bore 14 substantially larger than the diameter of the axle to provide ample space between the drive and axle for the accommodation of the segments of a divided bushing 15 of rubber or material of like resiliency and gripping qualities. To insure equable compression of the rubber bushings 15 the bore 14 of the drive is designed to form a true circle when the securing flanges 9 are brought together by the clamping bolts 12 as shown in Figures 2 and 6.

Figure 1:
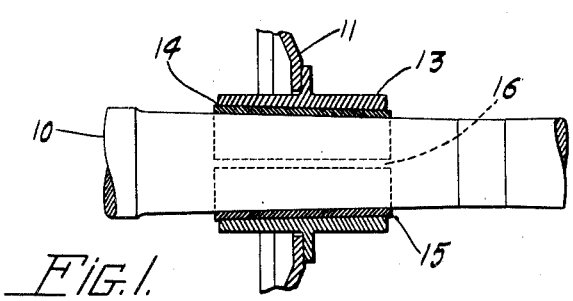
Figure 1 is a vertical section through a two-part drive longitudinally of the axle, showing the drive parts in assembled relation with segments of rubber bushing interposed in accordance with the invention.
Figure 2:
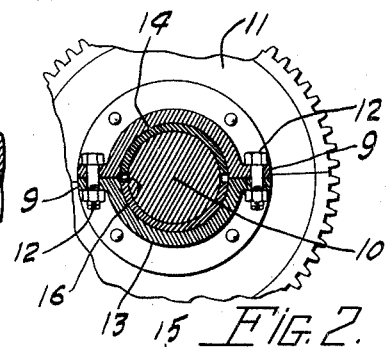
Figure 2 is a similar section transversely of the axle.

As indicated at 16 in Figures 1 and 2, the rubber segments are spaced apart to provide room for the flow of the rubber mass under compression, the bore 14 of the drive 11 being concentric with the axle and so proportioned with respect to axle diameter that the bushing 15 will be compressed when the drive parts are clamped together. To prevent any possibility of rotation of the rubber bushing 15 within bore 14 of the drive 11, the bore is preferably rough turned and provided with crosscuts designed to increase the grip of the bushing rubber upon the bore periphery.

The characteristics of rubber are such as to cause the mass to flow into the indentations in the surfaces of the axle and bore periphery under pressure whereby creeping of the drive will be checked and sudden rotational forces absorbed by the edgewise distortion of the bushing. As indicated in Figure 1, the bore 14 is tapered longitudinally of the axle to permit bushings 15 of uniform thickness between axle and drive.

Figure 7:
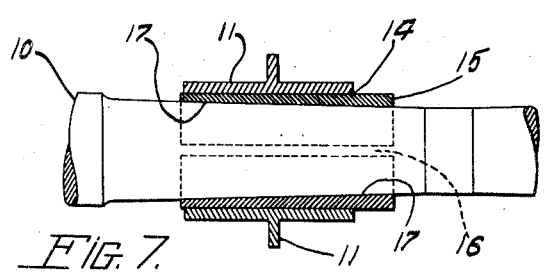
Figure 7 is a further modification showing the bushings tapered to permit adjustment of the drive longitudinally of the axle.

The reverse is true of the structure shown in Figure 7 in which the bore 14 of the drive 11 is cylindrical as well as adjacent outer surfaces of the bushing segments 15, but the axle engaging surface 17 thereof is tapered to conform to the slope of the axle whereby the drive may be adjusted to various positions along the axle by the wedging action of the tapered bushing between bore 14 of the drive 11 and the surface of the axle, as will be obvious.

Figure 3:
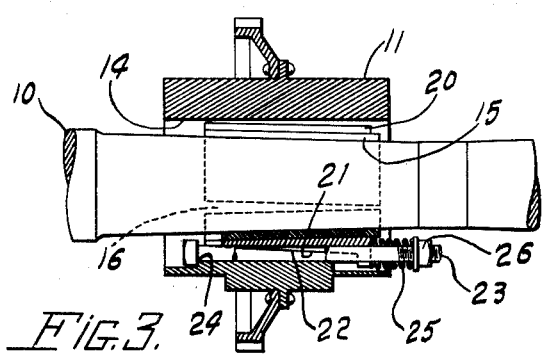
Figure 3 is a view similar to Figure 1 but illustrating a modified form of clamping arrangement for the drive, showing rubber bushing segments being held to the axle by the wedge shoes of the drive.
Figure 4:
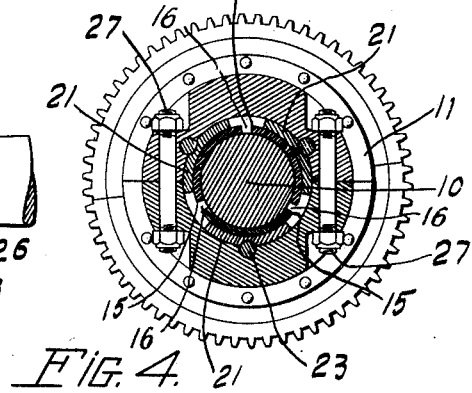
Figure 4 is a similar section transversely of the axle showing the wedge shoes of the drive engaging the rubber bushing segments.
Figure 5:
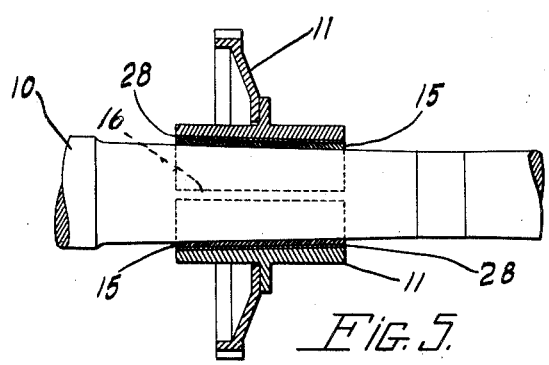
Figure 5 is a section similar to Figure 1, but showing the rubber bushings shimmed to compensate for variations in axle surface and bore of the drive.

In Figures 3 and 4, the divided driving gear 11 is fitted with clamping shoes 20 having wedge portions 21 engaging inclined plane surfaces 22 within bore 14 of the gear and adjustable longitudinally of the axle 10 by bolts 23 having their head portions bearing upon abutments 24 on the drive, and springs 25 seated against nuts 26 of the bolts and exerting a thrusting action upon adjacent end of shoes 20 for automatically taking up any slack between these parts. Bushings 15 of rubber are positioned between each shoe 20 and the axle and placed under initial pressure exerted by clamping bolts 27 securing the gear segments together. In Figure 3, the shank of bolt 23 is broken away to show engaging inclined portions 21 and 22 of wedging shoes 20 and bore 14, respectively, grooved to provide passageways for bolts 23. The thrust of springs 25 against shoes 20 will move the shoes longitudinally of inclined plane portions 22 in the bore 14 of the drive whereupon the resultant wedging action will cause the shoes to bear with clamping force upon adjacent bushing segments 15.

Due to possible variation in relative diameters of bore 14 and axle 10 the pressure upon interposed rubber bushings 15 may not be sufficient to cause the proper flow of rubber into the indentations in the rough bore and axle surfaces when clamping bolts 12 have been tightened. To compensate for the variations thus encountered it becomes necessary to introduce shims 28 of lead or other soft metal between bore 14 of the drive and adjacent portion of bushing 15 intermediate the side edges of the respective bushing segments.

This will cause displacement of the bushing rubber at the shim position to create sufficient pressure in the remainder of the mass to force it to conform to indentations in the bore and axle surfaces at clamping pressure, while the expansive force of the mass bushing rubber segments will be exerted to press the shim metal to the contour of adjacent bore surfaces and fill the indentations formed by the coarse tool feed boring operations, thus preventing displacement of the shims axially of the bore and thereby of the drive.

What I claim is:—

1. A generator drive assembly comprising a standard tapered car axle, a driving gear formed with its bore periphery parallel to the longitudinal axis of said axle and in spaced concentric relation to the axle surface, and a tapered resilient bushing in said bore, and means on said drive for compressing said bushing between said drive and axle.

2. A generator drive assembly comprising a standard tapered car axle, a resilient bushing disposed in sections radially of said axle, a sectional driving gear mounted upon said bushing in concentric relation to said axle, a sectional shim between said drive and bushing, and means carried by said drive for compressing said bushing and shim.

3. A generator drive assembly comprising a standard tapered car axle, a sectional driving gear formed with its bore periphery in spaced concentric relation to said axle and provided with a plurality of inclined planes longitudinally of the bore, wedging elements movable upon said planes, automatic tension devices mounted upon said planes and engaging said drive and wedging elements, a resilient bushing between said wedging elements and axle.

4. A generator drive assembly comprising a standard tapered car axle, a resilient bushing on said axle, a driving gear mounted upon said bushing in concentric relation to said axle, a soft metal shim between said drive and bushing, and means carried by said drive for compressing said bushing and shim.

5. A generator drive assembly comprising a standard tapered car axle, a driving gear removably mounted upon and in spaced concentric relation to said axle, and spaced resilient bushing segments of uniform thickness and variant cross-sectional area disposed radially with their respective side edges arranged longitudinally of and between said drive and axle and in substantial parallelism with contiguous edges of adjacent segments.

FRANK O. MARSHALL.